US012578003B2

(12) United States Patent
Sarapata et al.

(10) Patent No.: US 12,578,003 B2
(45) Date of Patent: Mar. 17, 2026

(54) HYDRAULIC COMPRESSION STOP WITH CLOSABLE WINDOWS

(71) Applicant: BeijingWest Industries Co., Ltd., Beijing (CN)

(72) Inventors: Mateusz Szymon Sarapata, Wysoka (PL); Dominik Kasprzyk, Debica (PL)

(73) Assignee: BeijingWest Industries Co., Ltd., Beijing (CN)

( * ) Notice: Subject to any disclaimer, the term of this patent is extended or adjusted under 35 U.S.C. 154(b) by 419 days.

(21) Appl. No.: 18/099,970

(22) Filed: Jan. 22, 2023

(65) Prior Publication Data

US 2023/0279921 A1 Sep. 7, 2023

(30) Foreign Application Priority Data

Mar. 3, 2022 (CN) .......................... 202210207655.0

(51) Int. Cl.
*F16F 9/49* (2006.01)
*F16F 9/34* (2006.01)

(52) U.S. Cl.
CPC . *F16F 9/49* (2013.01); *F16F 9/34* (2013.01)

(58) Field of Classification Search
CPC ...................................... F16F 9/49; F16F 9/34
USPC .................................................... 188/322.14
See application file for complete search history.

(56) References Cited

U.S. PATENT DOCUMENTS

| | | |
|---|---|---|
| 1,567,515 A | 12/1925 | Kijima et al. |
| 2,565,617 A | 8/1951 | Mercier et al. |
| 2,619,199 A | 11/1952 | Schwary |
| 2,695,778 A | 11/1954 | Mercier et al. |
| 2,742,112 A | 4/1956 | Wessel |

(Continued)

FOREIGN PATENT DOCUMENTS

| | | |
|---|---|---|
| CN | 108006145 A | 5/2018 |
| DE | 3326275 A1 | 2/1984 |

(Continued)

OTHER PUBLICATIONS

Extended European Search Report issued on Sep. 12, 2023 for counterpart European patent application No. 23156489.9.

(Continued)

*Primary Examiner* — Christopher P Schwartz
(74) *Attorney, Agent, or Firm* — William H. Honaker; Dickinson Wright PLLC

(57) ABSTRACT

A hydraulic compression stop (HCS) assembly includes an HCS base defining an HCS window providing fluid communication between a compression chamber of a damper and an exterior space; a spring guide movable relative to the HCS base by action of a piston; and a closure member attached to the spring guide and configured to selectively and progressively cover a portion of the HCS window to restrict fluid flow therethrough, with the portion of the HCS window covered varying with a position of the spring guide relative to the HCS base. A damper assembly includes a tube defining an interior chamber; a piston slidably disposed in the tube and dividing the interior chamber into a rebound chamber and a compression chamber; and the HCS assembly disposed at least partially within the compression chamber to restrict fluid flow therethrough, the restriction varying in response to the piston moving toward the HCS base.

20 Claims, 12 Drawing Sheets

(56)  References Cited

U.S. PATENT DOCUMENTS

| | | | | |
|---|---|---|---|---|
| 4,250,793 | A | 2/1981 | Berg | |
| 4,768,629 | A | 9/1988 | Wossner | |
| 4,782,925 | A | 11/1988 | Grundei | |
| 5,180,186 | A * | 1/1993 | Charles | F16F 9/36 |
| | | | | 188/282.1 |
| 5,333,708 | A * | 8/1994 | Jensen | F16F 9/49 |
| | | | | 188/284 |
| 5,657,511 | A | 8/1997 | Lan | |
| 8,393,444 | B2 * | 3/2013 | Martin | F16F 3/023 |
| | | | | 188/266 |
| 9,605,726 | B2 * | 3/2017 | Baldoni | F16F 9/49 |
| 10,962,081 | B2 * | 3/2021 | Sankaran | B60G 13/08 |
| 11,867,254 | B2 * | 1/2024 | Sankaran | F16F 9/49 |
| 2016/0185181 | A1 | 6/2016 | Watanabe | |
| 2017/0219043 | A1 | 8/2017 | Firek et al. | |
| 2018/0156302 | A1 | 6/2018 | Kus et al. | |
| 2018/0355944 | A1 * | 12/2018 | Veltum | F16F 9/185 |
| 2020/0011395 | A1 | 1/2020 | Sankaran et al. | |

FOREIGN PATENT DOCUMENTS

| | | | |
|---|---|---|---|
| DE | 3510866 | A1 | 10/1988 |
| DE | 3914298 | C1 | 8/1990 |
| FR | 810938 | A | 1/1937 |
| FR | 2902850 | A1 | 12/2007 |
| GB | 136813 | A | 10/1920 |
| GB | 764594 | A | 12/1956 |
| JP | 2014181757 | A | 9/2014 |
| JP | 2021523050 | A | 9/2021 |

OTHER PUBLICATIONS

First Office Action and Search Report issued on Jun. 2, 2023 for counterpart Chinese patent application No. 202210207655.0, along with machine EN translation.
The First Office Action issued on Nov. 11, 2025 for counterpart European patent application No. 23156489.9 (8 pages).

* cited by examiner

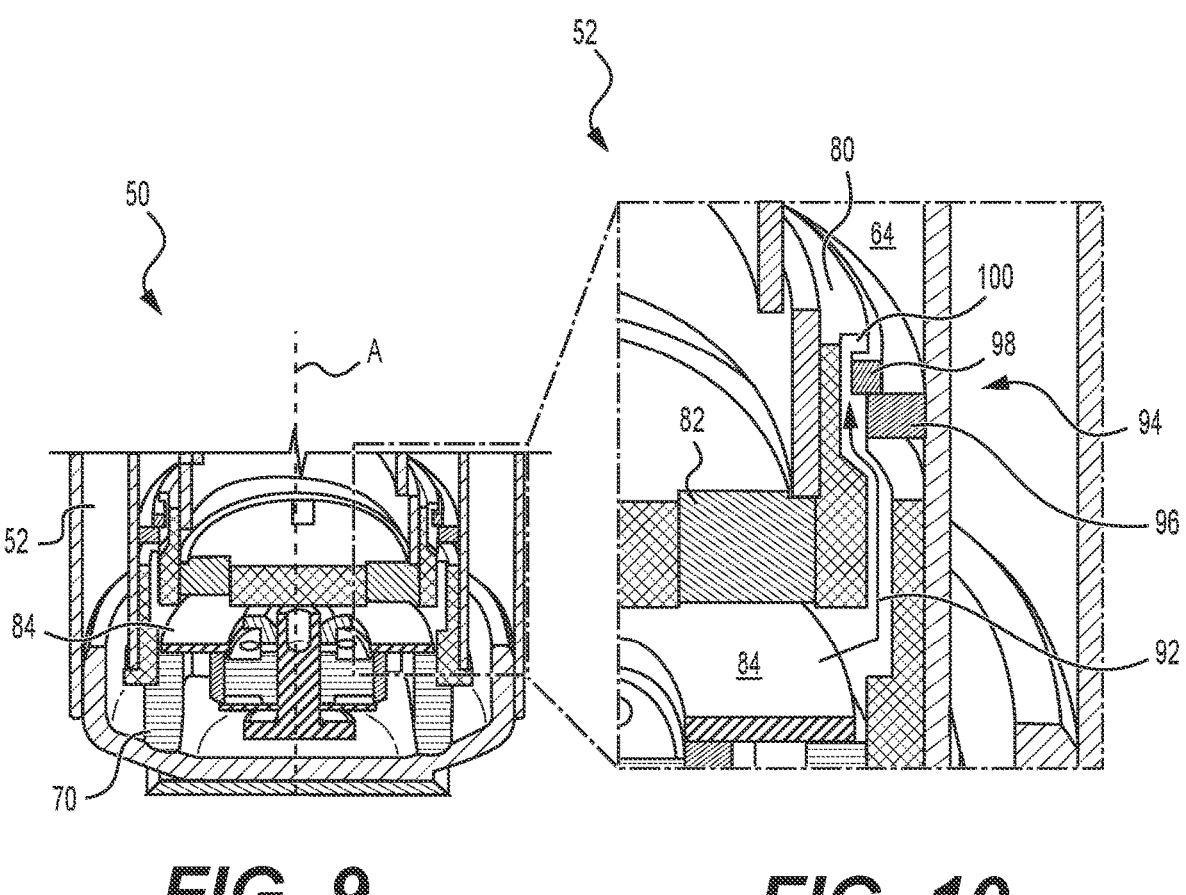
FIG. 9                    FIG. 10

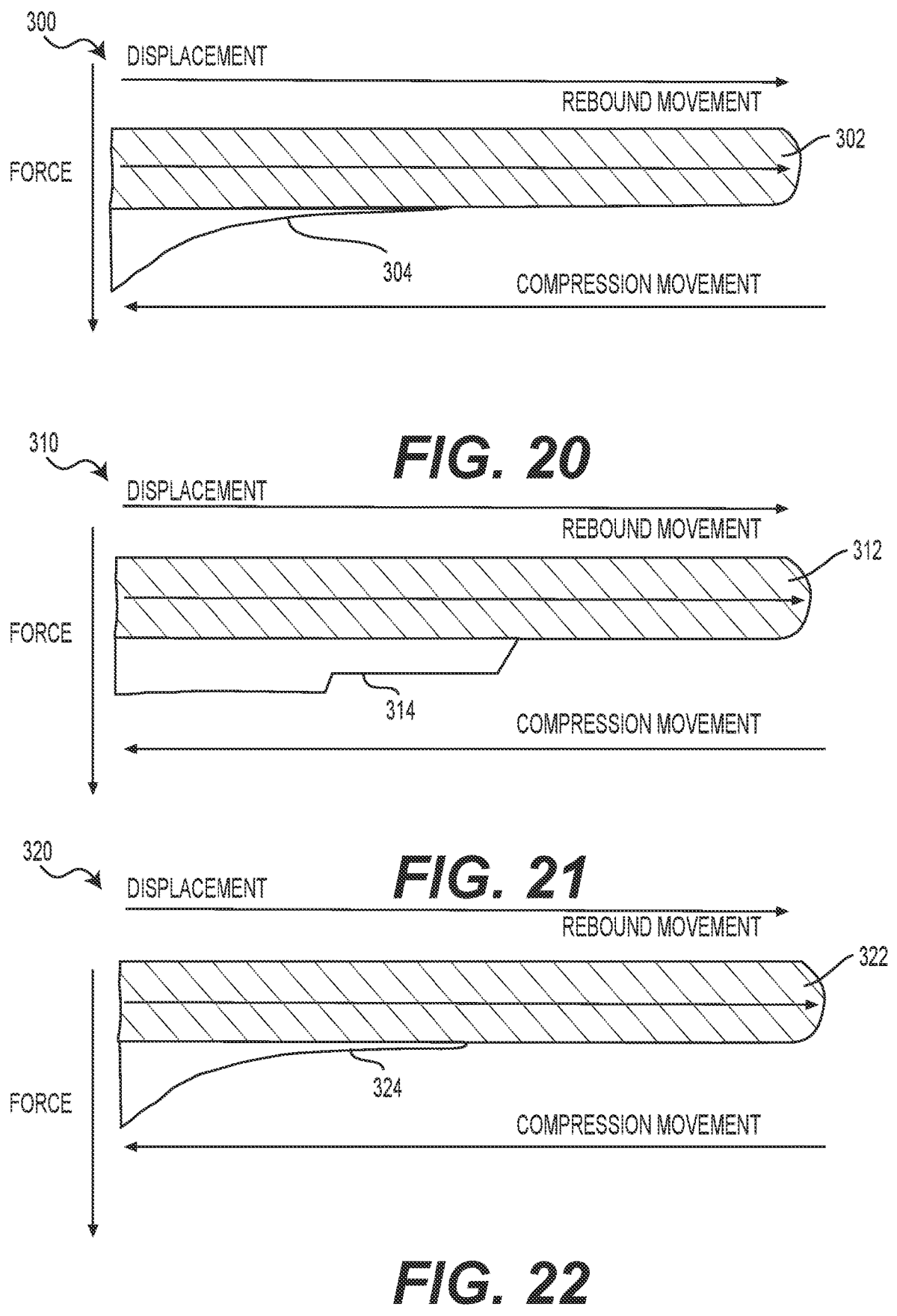

300

DISPLACEMENT

REBOUND MOVEMENT

302

FORCE

304

COMPRESSION MOVEMENT

DISPLACEMENT

REBOUND MOVEMENT

312

FORCE

314

COMPRESSION MOVEMENT

DISPLACEMENT

REBOUND MOVEMENT

322

FORCE

324

COMPRESSION MOVEMENT

*FIG. 22*

HYDRAULIC COMPRESSION STOP WITH CLOSABLE WINDOWS

CROSS-REFERENCE TO RELATED APPLICATIONS

This application claims priority to Chinese Patent Application No. 202210207655.0, filed on Mar. 3, 2022, which is hereby incorporated by reference in its entirety.

BACKGROUND OF THE INVENTION

1. Field of the Invention

The present invention generally relates to a damper assembly for a vehicle.

2. Description of the Prior Art

Damper assemblies are well known in the art for use in a vehicle. Vehicle suspension systems are designed to absorb the shock caused by uneven driving surfaces. Damper assemblies assist the suspension system by capturing vibrations between the wheels and the vehicle body. Dampers typically work in tandem with a spring, where the damper absorbs the excess force, the spring may transfer to the vehicle body. On bumpy roads, especially on a curve, the vibrations of the vehicle body become serious enough to cause a driver to lose control of the vehicle. The damper assemblies dampen out the mainspring oscillations once the wheel has passed the bumpy area. The spring energy is converted to heat and dissipated by the dampers. Early dampers were merely cylinders filled with oil or gas; damper designs have improved since.

In some designs, a damper assembly may provide enhanced damping properties using a hydraulic compression stop arrangement that generates additional damping force over a predefined end section of an operating travel range of the piston rod. Exemplary dampers provided with such hydraulic compression stop arrangements are disclosed in patent publications. The hydraulic compression stop arrangements permit progressive generation of additional damping force depending not only on a piston assembly position but also on its velocity within the predefined end section, which may be tunable.

However, such hydraulic compression stop arrangements may limit piston stroke length by using space within a damper that would otherwise be available for piston stroke.

SUMMARY OF THE INVENTION

The present invention provides a damper assembly. The damper assembly comprises: a tube defining an interior chamber; a piston slidably disposed in the tube and dividing the interior chamber into a rebound chamber and a compression chamber; and a hydraulic compression stop (HCS) assembly disposed at least partially within the compression chamber and including an HCS base defining an HCS window providing fluid communication between the compression chamber and an exterior space, the HCS assembly further including a closure member configured to selectively and progressively cover a portion of the HCS window to restrict fluid flow therethrough, the portion of the HCS window covered varying in response to the piston moving toward the HCS base.

The present invention also provides a hydraulic compression stop (HCS) assembly. The HCS assembly comprises: an HCS base defining an HCS window providing fluid communication between a compression chamber of a damper and an exterior space; a spring guide movable relative to the HCS base by action of a piston; and a closure member attached to the spring guide and configured to selectively and progressively cover a portion of the HCS window to restrict fluid flow therethrough, with the portion of the HCS window covered varying with a position of the spring guide relative to the HCS base.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 9 shows an enlarged section of the fragmentary cross-sectional view of the first HCS assembly of FIG. 5, in the extended position;

FIG. 10 shows an enlarged view of a section of FIG. 9 and showing fluid flow through the first HCS assembly during a rebound stroke;

FIG. 20 shows a graph of force vs. displacement of the first HCS assembly;

FIG. 21 shows a graph of force vs. displacement of the second HCS assembly;

FIG. 22 shows a graph of force vs. displacement of the third HCS assembly;

DESCRIPTION OF THE ENABLING EMBODIMENT

Referring to the Figures, wherein like numerals indicate corresponding parts throughout the several views, FIGS. 1-4 show aspects of dampers with conventional hydraulic compression stops, and FIGS. 5-24 show aspects of a damper with a hydraulic compression stop (HCS) in accordance with various aspects of the present disclosure.

Figures 1, 2:
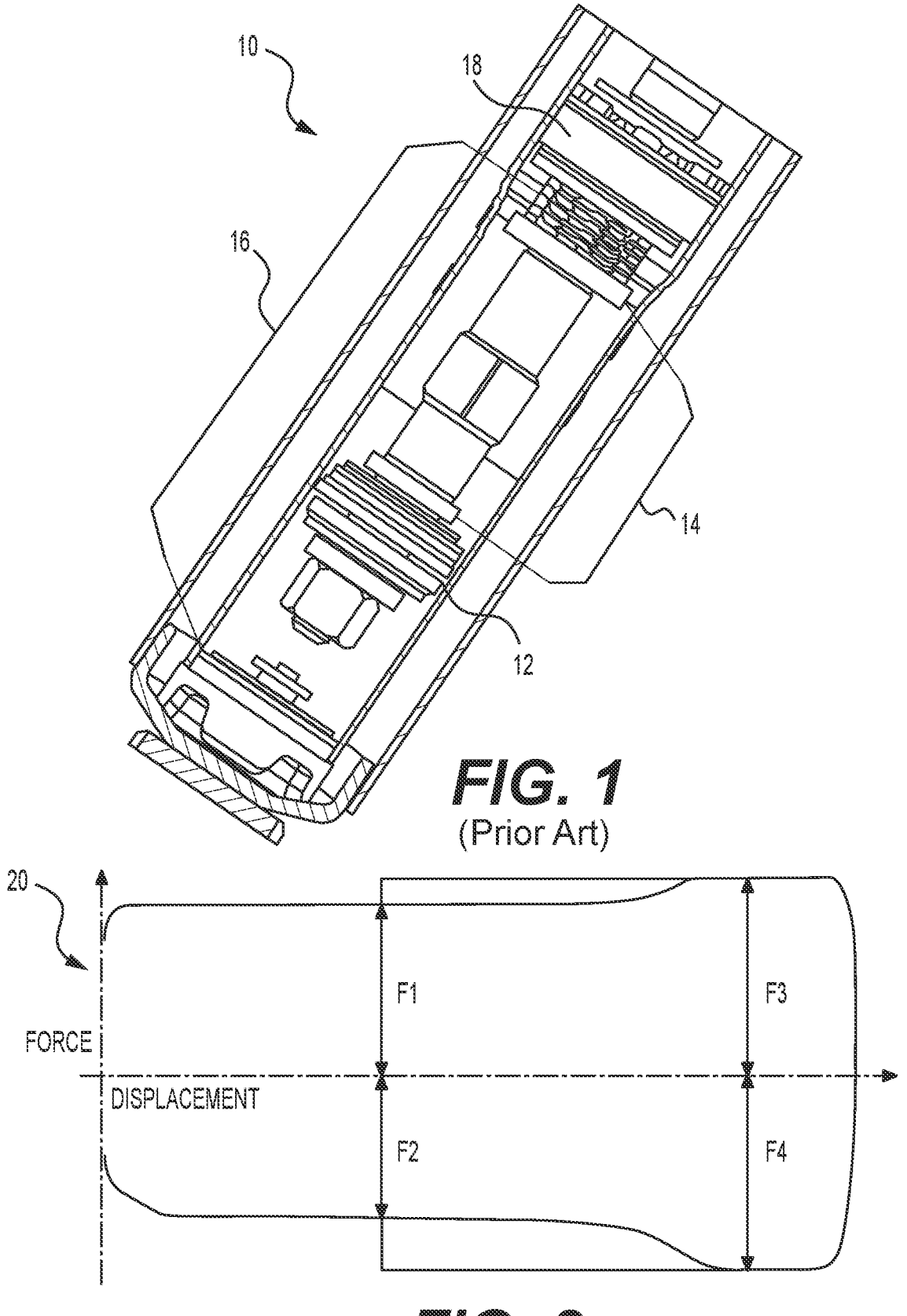
FIG. 1 shows a fragmentary cross-sectional view of a damper with a low damping hydraulic compression stop (HCS) of the prior art.
FIG. 2 shows a graph of force vs. displacement of the low damping HCS of FIG. 1.

FIG. 1 shows a fragmentary cross-sectional view of a first damper 10 with a low damping hydraulic compression stop of the prior art, abbreviated HCS-LD. The HCS-LD generates additional damping forces in both compression and rebound directions in a displacement region near full compression. The HCS-LD is illustrated with a cylinder tube with a neck-down region 16 having a reduced diameter. The HCS-LD includes an HCS tenon 14 attached to a piston 18, and with a lowermost edge including an HCS valve 12 configured to fit tightly within the neck-down region 16 for restricting fluid flow thereacross, thereby generating the additional damping forces.

FIG. 2 shows a first graph 20 of force vs. displacement of the first damper 10 with the low damping hydraulic compression stop of FIG. 1. As shown in FIG. 2, the first damper 10 with the HCS-LD generates similar damping forces in both compression and rebound directions. A disadvantage of the HCS-LD design is its packaging which consumes piston valve stroke length (aka., system dead-length). The first graph 20 illustrates a standard damping rebound force F1 and a standard damping compression force F2 in an opposite direction and in a displacement region where the HCS-LD is not active. In an HCS active region, where the HCS-LD is active, adjacent to a full-compression displacement, each of the rebound and compression forces increase. The force required to move the piston 18 of the first damper 10 in a rebound direction increases to an HCS total rebound force F3 in the HCS active region. Likewise, the force required to move the piston 18 of the first damper 10 in a compression direction increases to an HCS total compression force F4 in the HCS active region.

Figures 3, 4:
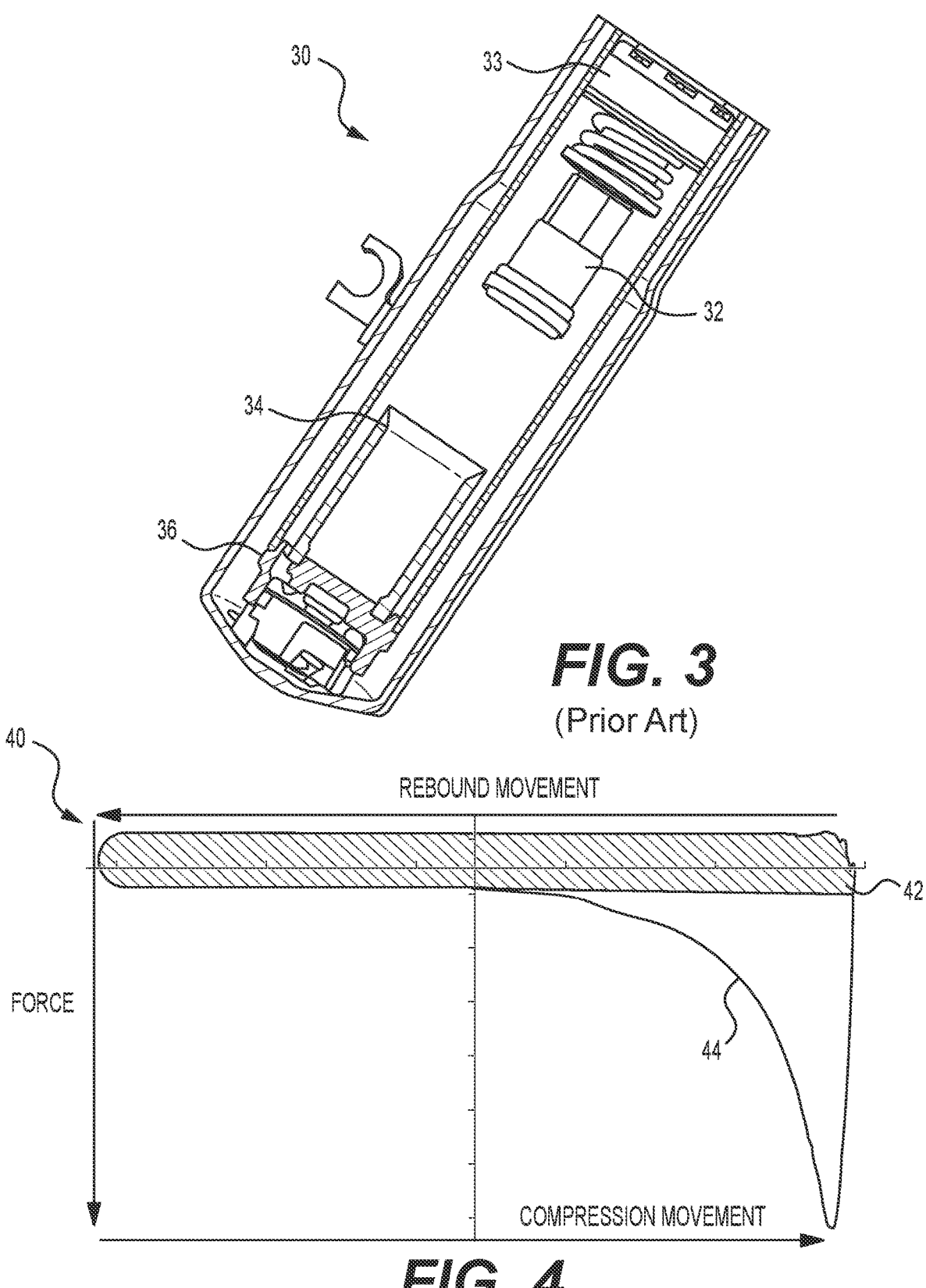
FIG. 3 shows a fragmentary cross-sectional view of a damper with a high damping HCS of the prior art.
FIG. 4 shows a graph of force vs. displacement of the high damping HCS of FIG. 3.

FIG. 3 shows a fragmentary cross-sectional view of a second damper 30 with a high damping hydraulic compression stop of the prior art, abbreviated HCS-HD. The HCS-HD includes a plunger 32 attached to a piston 33. The HCS-HD also includes a sleeve 34 having a cup shape fixed within a compression end of the second damper 30 and configured to receive the plunger 32 in a fluid-tight configuration. Further movement into compression results in oil flowing through the sleeve. By restricting this fluid flow, the HCS-HD generates the additional damping forces at the compression end of the second damper 30

The conventional hydraulic compression stops HCS-LD and HCS-HD may take a relatively large space. This may result in a stroke of a shock absorber with such a conventional HCS device, to be reduced by a length of the HCS valve and/or the HCS tenon 14 with the plunger 32 or cylinder tube neck down/sleeve 34. An additional factor that reduces the stroke is system death length. Any increase in a working range of a conventional HCS device reduces the operating stroke of the shock absorber because the standard valve on a piston rod cannot work in a neck or sleeve, such as those used in conventional HCS devices.

FIG. 4 shows a second graph 40 of force vs. displacement of the second damper 30 of FIG. 3. As shown in FIG. 4, the HCS-HD generates a progressive damping characteristic in the compression direction and a substantially constant force in the rebound direction. The use of this type of device allows for comfortable tuning of the shock absorbers in the range of the basic stroke and at the same time allows generation of much greater damping forces in the lower part of the stroke of the second damper 30 during large suspension deflections, thus increasing the safety of the vehicle and securing the suspension against full compression impact. The second graph 40 includes a first plot 42 of a standard damping force (i.e. a plot of the second damper 30 without any HCS damping), and a second plot 44 showing progressively increasing force generated by the HCS-HD in a compression direction and adjacent to the full-compressed position, and without any corresponding increase in rebound force.

Figures 5, 6:
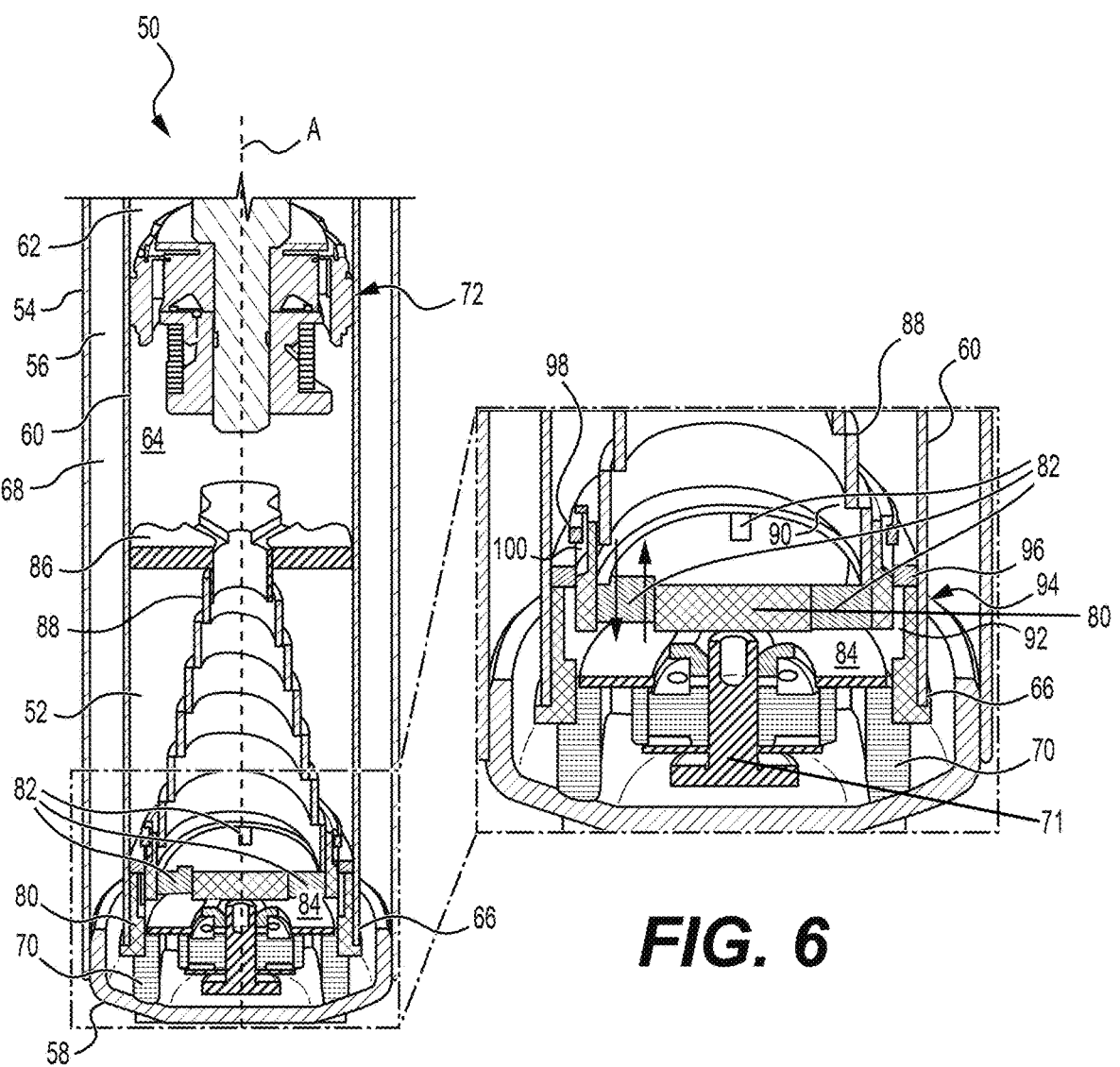
FIG. 5 shows a fragmentary cross-sectional view of a damper with a first HCS assembly in an extended position, according to an aspect of the present disclosure.
FIG. 6 shows an enlarged view of a section of FIG. 5, showing fluid flow through the first HCS assembly and when the HCS assembly is inactive.

FIG. 5 shows a fragmentary cross-sectional view of a third damper 50 with a first HCS assembly 52 in accordance with an embodiment of the present invention. FIG. 5 shows the first HCS assembly 52 in an extended position, with a piston 72 spaced apart therefrom. In the extended position, the first HCS assembly 52 is inactive, providing no additional compression damping force. The third damper 50 includes a housing 54 having a tubular shape defining a main chamber 56 and extending along a center axis A, and an end cap 58 enclosing an end of the housing 54.

An inner tube 60 is located within the housing 54 and coaxially therewith. The inner tube 60 defines an interior chamber 62,64 between a first end (not shown) and a second end 66 located adjacent to the end cap 58, the inner tube 60 further defines a compensation chamber 68 extending annularly between the inner tube 60 and the housing 54. A base valve 70 is disposed in the main chamber 56 of the housing 54 adjacent to the end cap 58 and is configured to restrict fluid flow between the interior chamber 62,64 and the compensation chamber 68. The base valve 70 includes a retaining component 71, which is inverted T shaped, passing through the base valve 70 and retaining components of the base valve 70 together.

The third damper 50 also includes a piston 72 slidably disposed in the inner tube 60 and dividing the interior chamber 62, 64 into a rebound chamber 62 and a compression chamber 64. The compression chamber 64 extends between the piston 72 and the base valve 70, and the rebound chamber extends between the first end and the piston 72.

The third damper 50 also includes the first HCS assembly 52 disposed, at least partially, within the compression chamber 64 of the inner tube 60, adjacent to the base valve 70 and including a first HCS base 80 defining a plurality of first HCS windows 82 providing fluid communication between the compression chamber 64 and an exterior space 84. Four of the first HCS windows 82 through the first HCS base 80 are shown, each having a rectangular shape and being arranged at regular 90-degree intervals. However, the first HCS windows 82 may include any number of first HCS windows 82, which may have a different size, shape, or placement in the first HCS base 80. The exterior space 84 may provide fluid communication into the base valve 70, and further to the compensation chamber 68. The first HCS assembly 52 also includes a first spring guide 86 located within the compression chamber 64 and a conical belt spring 88 connecting the first spring guide 86 to the first HCS base 80. The conical belt spring 88 of the first HCS assembly 52 includes a band of material formed as a spiral-shaped coil with a spring base 90 adjacent to the first HCS base 80. The conical belt spring 88 of the first HCS assembly 52 functions as a closure member to progressively cover portions of each of the first HCS windows 82, with the covered portions varying in size in response to the piston 72 compressing the conical belt spring 88 as the piston 72 moves toward the first HCS base 80.

As shown in FIG. 6, the first HCS assembly 52 is inactive, with the first HCS windows 82 fully open, thereby generating relative low damping force when the piston 72 is spaced apart therefrom.

Figures 7, 8:
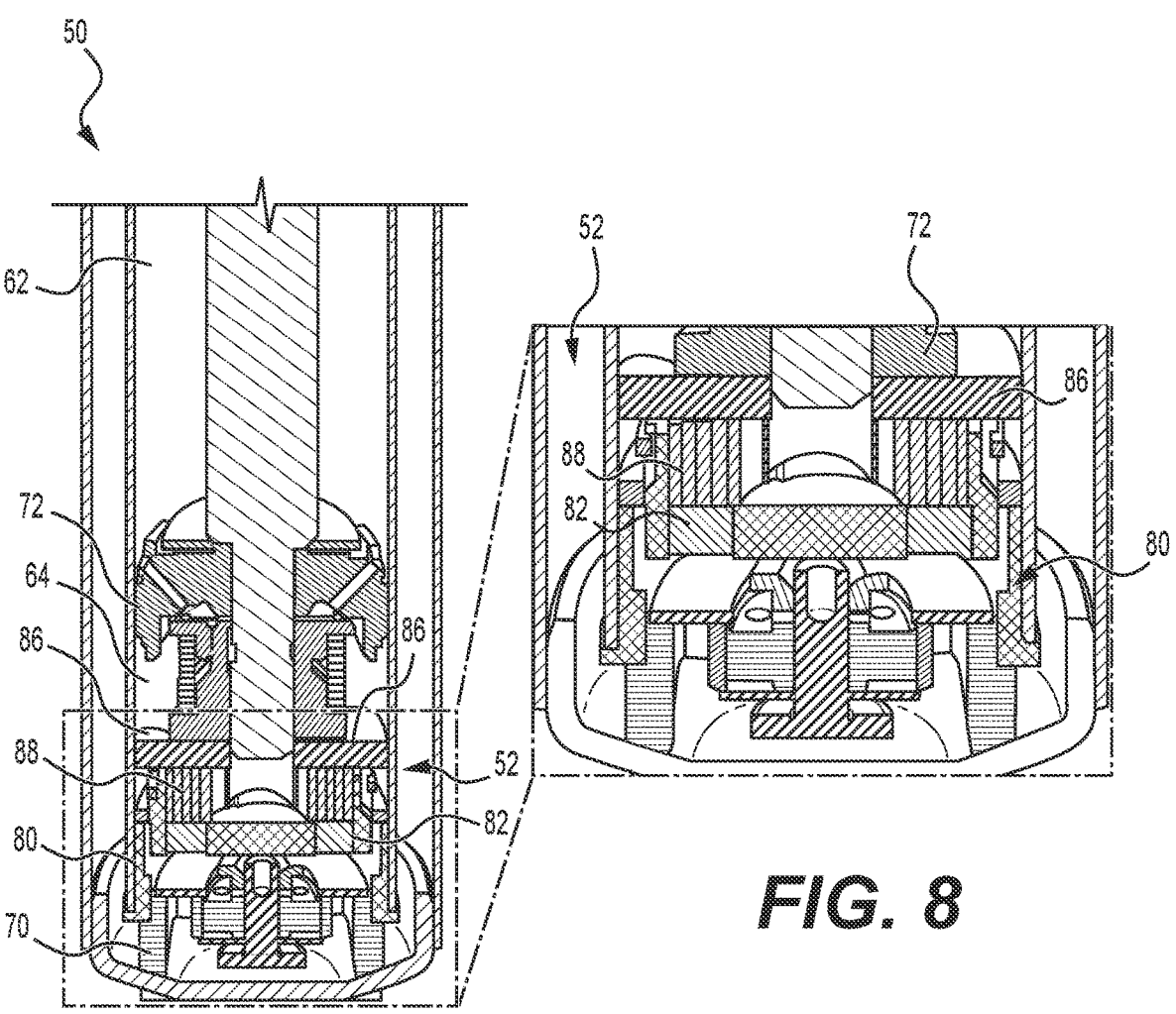
FIG. 7 shows a fragmentary cross-sectional view of the damper with the first HCS assembly of FIG. 5 in a full-compressed position.
FIG. 8 shows an enlarged view of a section of FIG. 7.

The first HCS base 80 also defines a return fluid passage 92 configured to transmit fluid from the exterior space 84 and to the compression chamber 64 in response to the piston 72 moving away from the first HCS assembly 52 during a rebound stroke, with the piston 72 moving away from the first HCS assembly 52. The first HCS assembly 52 also includes a check valve 94 configured to allow fluid flow through the return fluid passage 92 from the exterior space 84 and to the compression chamber 64 while blocking fluid flow in an opposite direction. The check valve 94 shown in FIG. 6 includes a sealing ring 96 that extends annularly around the first HCS base 80 and adjacent to an interior wall of the inner tube 60. The sealing ring 96 is configured to selectively cover the return fluid passage 92 to block fluid flow therethrough and in response to a pressure differential between the compression chamber 64 and the exterior space 84. The check valve 94 also includes a retaining ring 98 disposed around the first HCS base 80 within a corresponding groove therein. The retaining ring 98 holds the sealing ring 96 with the first HCS base 80 by limiting movement of the sealing ring 96 away from the return fluid passage 92. FIGS. 7-8 show a fragmentary cross-sectional view of the third damper 50 with the first HCS assembly 52 in a full-compressed position. In the full-compressed position, the piston 72 contacts the first spring guide 86 and thereby compresses the conical belt spring 88 and covers all, or substantially all, of the first HCS windows 82. Thus, the first HCS assembly 52 provides a maximum fluid restriction through the first HCS windows 82, and a corresponding maximum compression damping force, in the full-compressed position.

FIGS. 9-10 shows an enlarged view of the first HCS assembly 52 in an extended position and with the third damper 50 in a rebound configuration, with the piston (not shown on FIGS. 9-10) moving away from the base valve 70. FIG. 10 shows the check valve 94 of the first HCS assembly 52 in an opened configuration, with the sealing ring 96 axially spaced away from the return fluid passage 92 for allowing fluid flow through from the exterior space 84 to the compression chamber 64. FIG. 10 also shows the first HCS base 80 defining an upper fluid passage 100 located radially inwardly from the sealing ring 96 and providing fluid communication from the return fluid passage 92 to the compression chamber 64.

One or more design parameters of the first HCS assembly 52 may be adjusted to switch points of the HCS system which may be regulated by a length of the conical belt spring 88. The progression and force levels are regulated by but are not limited to the length and/or width of the coils within the conical belt spring 88 and/or a size, shape, and/or position of the first HCS windows 82.

Figures 11, 12:
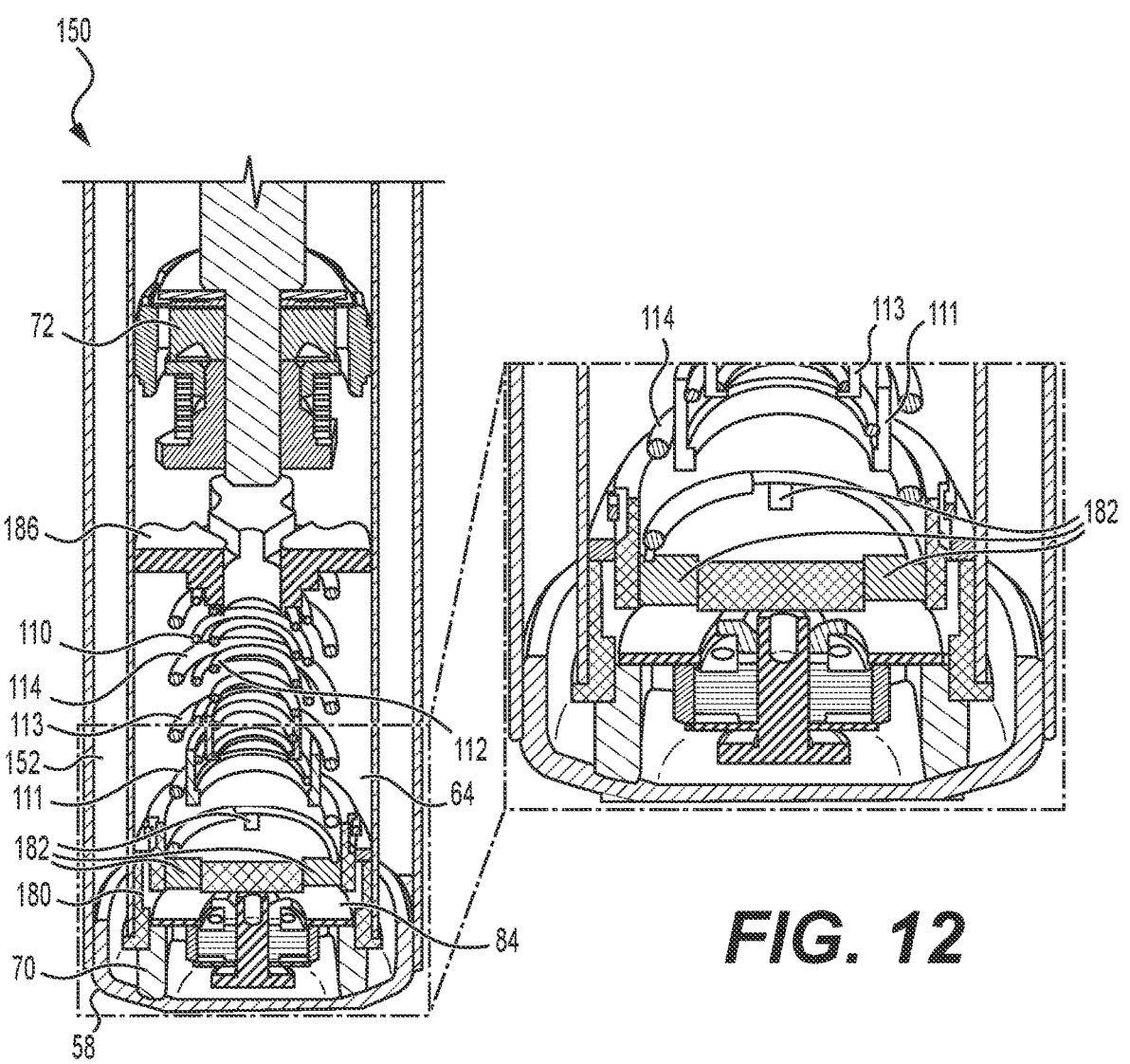
FIG. 11 shows a fragmentary cross-sectional view of a damper with a second HCS assembly in an extended position, according to an aspect of the present disclosure.
FIG. 12 shows an enlarged view of a section of FIG. 11, showing fluid flow through the second HCS assembly.

FIG. 11 shows a fragmentary cross-sectional view of a fourth damper 150 with a second HCS assembly 152 in accordance with an embodiment of the present invention. FIG. 11 shows the second HCS assembly 152 in an extended position, with a piston 72 spaced apart therefrom. In the extended position, the second HCS assembly 152 is inactive, providing no additional compression damping force. The fourth damper 150 may be similar or identical to the third damper 50 of FIG. 5, except for the inclusion of the second HCS assembly 152 in place of the first HCS assembly 52. The second HCS assembly 152 may be similar or identical to the first HCS assembly 52, except for differences described herein.

As shown in FIGS. 11-12, the second HCS assembly 152 includes a second HCS base 180 defining a plurality of second HCS windows 182 providing fluid communication between the compression chamber 64 and the exterior space 84. The second HCS assembly 152 also includes a second spring guide 186 located within the compression chamber 64. The second spring guide 186 may be similar or identical to the first spring guide 86 of the first HCS assembly 52.

The second HCS assembly includes a first coil spring 110 attached to the second spring guide 186 and extending therefrom toward the second HCS base 180. The first coil spring 110 covers a first region of the second HCS windows 182 in response to the piston 72 being located within a first distance from the second HCS base 180. The second HCS assembly also includes a second coil spring 112 attached to the second spring guide 186 and extending therefrom toward the second HCS base 180. The second coil spring 112 covers a second region of the second HCS windows 182 in response to the piston 72 being located within a second distance from the second HCS base 180, the second distance being smaller than the first distance.

In operation, and during a compression stroke, the piston 72 moves axially toward the second HCS base 180, engaging the second spring guide 186 and moving the second spring guide 186 toward the second HCS base 180. When the piston 72 reaches the first distance away from the second HCS base 180, the first coil spring 110 starts to cover the first region of the second HCS windows 182, restricting fluid flow therethrough and thereby increasing damping force. The piston 72 continues to travel toward the second HCS base 180. When the piston 72 reaches the second distance away from the second HCS base, the second coil spring 112 starts to cover the second region of the second HCS windows 182, further restricting fluid flow therethrough and thereby further increasing damping force. The second HCS assembly 152 includes two coil springs 110, 112 configured to selectively cover the second HCS windows 182. However, any number of coil springs may be used.

Still referring to FIGS. 11-12, the second HCS assembly 152 also includes a third spring 114 which extends between the second HCS base 180 and the second spring guide 186 to bias the second spring guide 186, with each of the first coil spring 110 and the second coil spring 112, away from the second HCS base 180. The third spring 114 is shown as a coil spring, but other types of springs may be used.

In some embodiments, and as shown in FIGS. 11-12, the second HCS assembly 152 also includes a first spring cap 111 attached to the first coil spring 110 opposite the second spring guide 186. The first spring cap 111 is configured to selectively cover the first region of the second HCS windows 182. In some embodiments, and as shown in FIGS. 11-12, the second HCS assembly 152 also includes a second spring cap 113 attached to the second coil spring 112 opposite the second spring guide 186. The second spring cap 113 is configured to selectively cover the second region of the second HCS windows 182. Each of the spring caps 111, 113 has a tubular shape with a flat bottom edge to seal against the second HCS base 180, preventing leakage from the corresponding covered portions of the second HCS windows 182.

FIG. 12 shows an enlarged view of a section of FIG. 11, showing fluid flow through the second HCS windows 182.

Figures 13, 14:
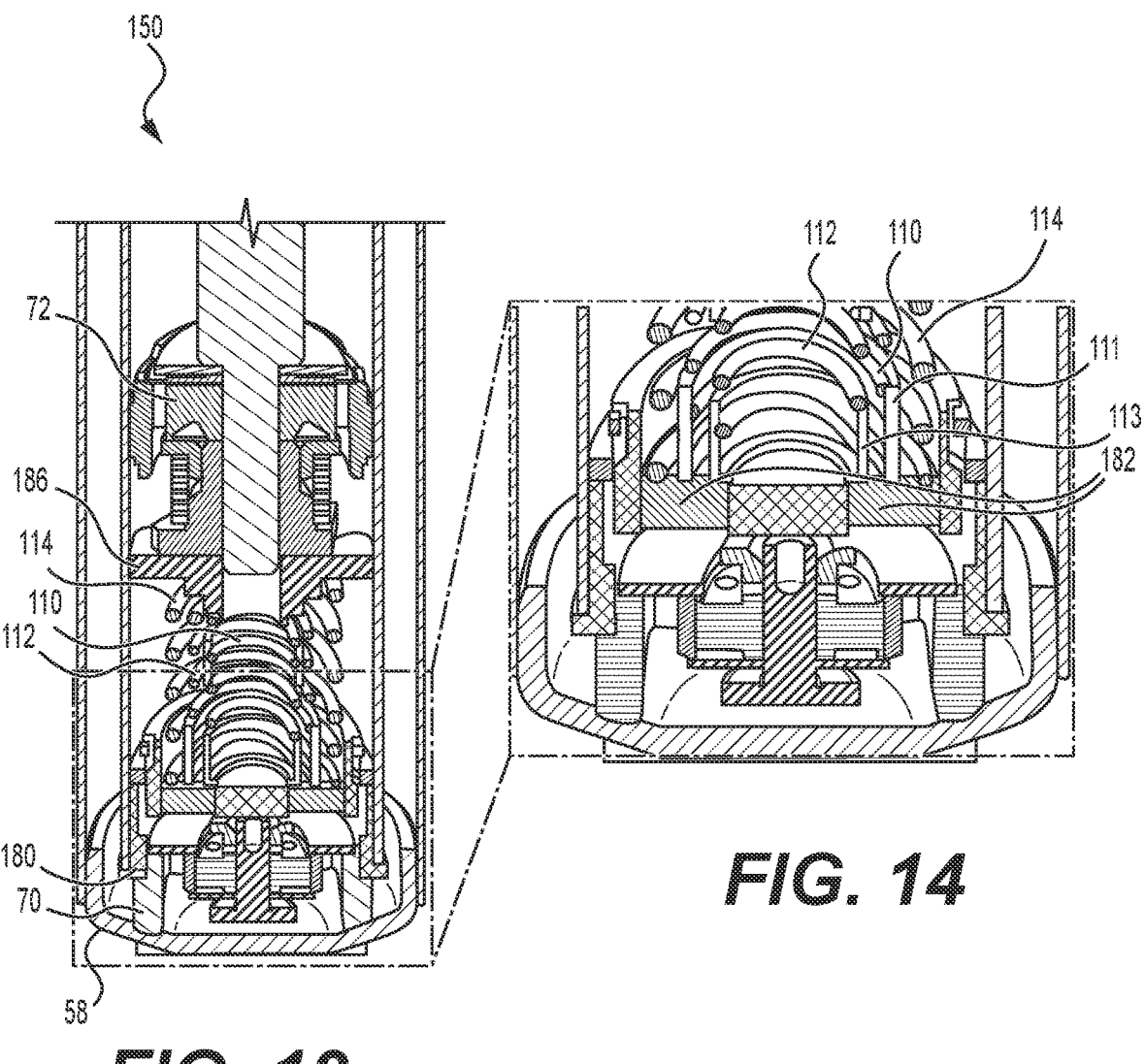
FIG. 13 shows a fragmentary cross-sectional view of the damper with the second HCS assembly of FIG. 11 and in a partially-compressed position.
FIG. 14 shows an enlarged view of a section of FIG. 13.

FIG. 13-14 show fragmentary cross-sectional views of the fourth damper 150 with the second HCS assembly 152 and in a partially-compressed position, with the spring caps 111, 113 covering the respective regions of the second HCS windows 182.

Figures 15, 16:
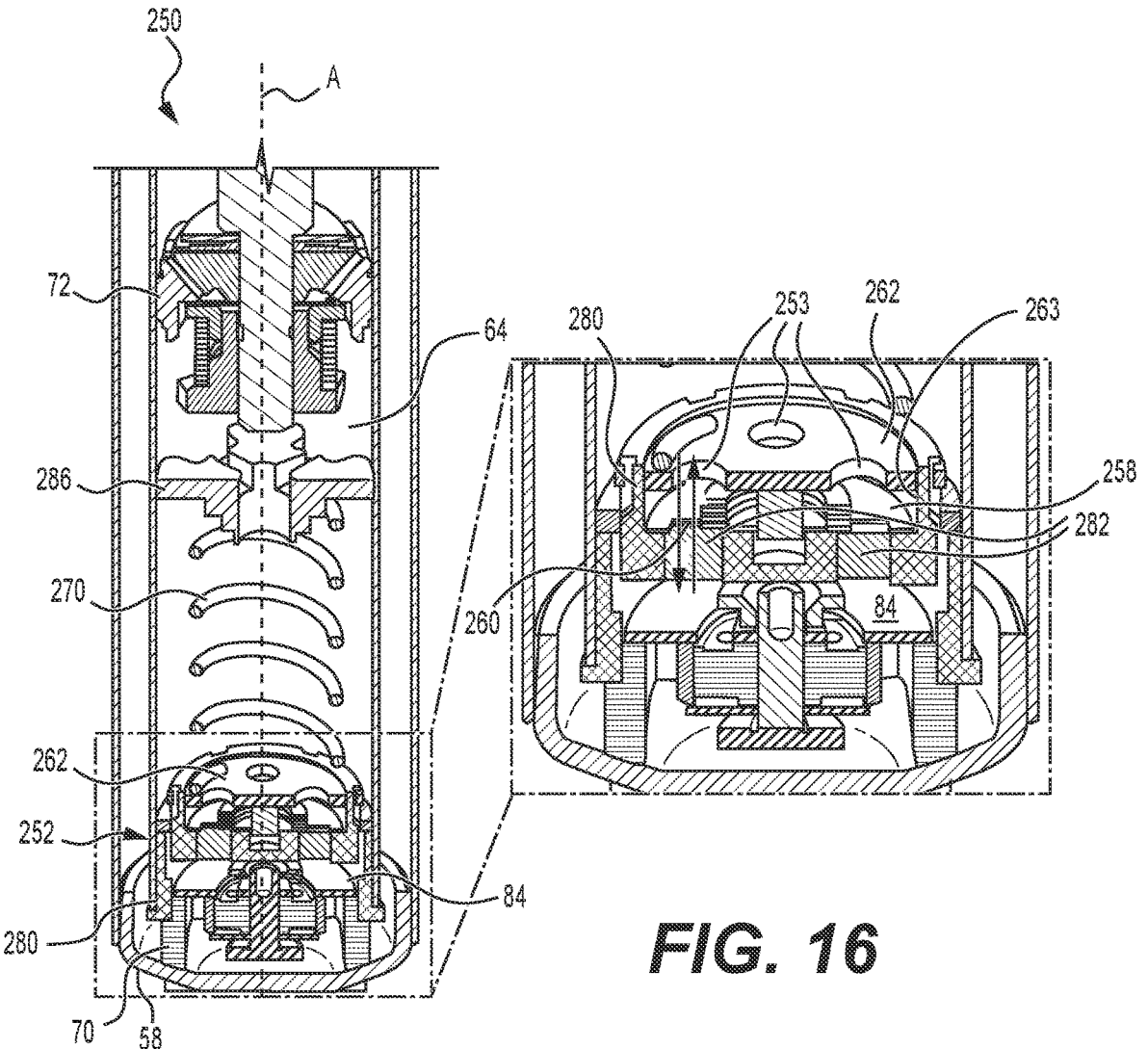
FIG. 15 shows a fragmentary cross-sectional view of a damper with a third HCS assembly in an extended position, according to an aspect of the present disclosure.
FIG. 16 shows an enlarged view of a section of FIG. 15, showing fluid flow through the third HCS assembly.

FIGS. 15-16 show fragmentary cross-sectional views of a fifth damper 250 with a third HCS assembly 252 stop in accordance with an embodiment of the present invention. FIG. 15 shows the third HCS assembly 252 in an extended position, with a piston 72 spaced apart therefrom. In the extended position, the third HCS assembly 252 is inactive, providing little or no additional compression damping force. The fifth damper 250 may be similar or identical to the third damper 50 of FIG. 5, except for the inclusion of the third HCS assembly 252 in place of the first HCS assembly 52. The third HCS assembly 252 may be similar or identical to the first HCS assembly 52, except for differences described herein.

As shown in FIGS. 15-16, the third HCS assembly 252 includes a third HCS base 280 defining a plurality of third HCS windows 282 providing fluid communication between the compression chamber 64 and the exterior space 84. The third HCS assembly 252 also includes a third spring guide 286 located within the compression chamber 64. The third spring guide 286 may be similar or identical to the first spring guide 86 of the first HCS assembly 52.

The third HCS assembly 252 also includes a rotary disc 258 defining several holes 260 each having a rectangular shape. One or more of the holes 260 may have a different shape, such as a triangular, trapezoidal, oval, etc. The rotary disc 258 is configured to rotate relative to the third HCS base 280 and is rotatable between a first position and a second position. In the first position, the holes 260 overly corresponding ones of the third HCS windows 282 to provide fluid communication therethrough In the second position the holes 260 are rotationally spaced away from the HCS windows 282 and the rotary disc 258 blocks the third HCS windows 282. The rotary disc 258 is movable through a continuous range of intermediate positions between the first and second positions, with the rotary disc 258 partially covering a portion of the HCS windows 282 to vary an amount of restriction to fluid flow therethrough.

The third HCS assembly 252 also includes a translating member 262 configured to rotate the rotary disc 258 between the first position and the second position in response to a compression force applied thereto. As shown in FIG. 15-16, the translating member 262 is configured as a round disc slidably disposed within a corresponding bore 263 in the third HCS base 280 and configured to translate axially along the center axis A. The translating member 262 includes a plurality of through holes 264 for providing fluid flow therethrough, as indicated by the flow arrows shown in FIG. 16.

The third HCS assembly 252 also includes a compression spring 270 disposed between the third spring guide 286 and the translating member 262. The compression spring 270 imparts a compression force to the translating member 262 in response to the piston 72 biasing the third spring guide 286 toward the third HCS base 280.

Figure 17:
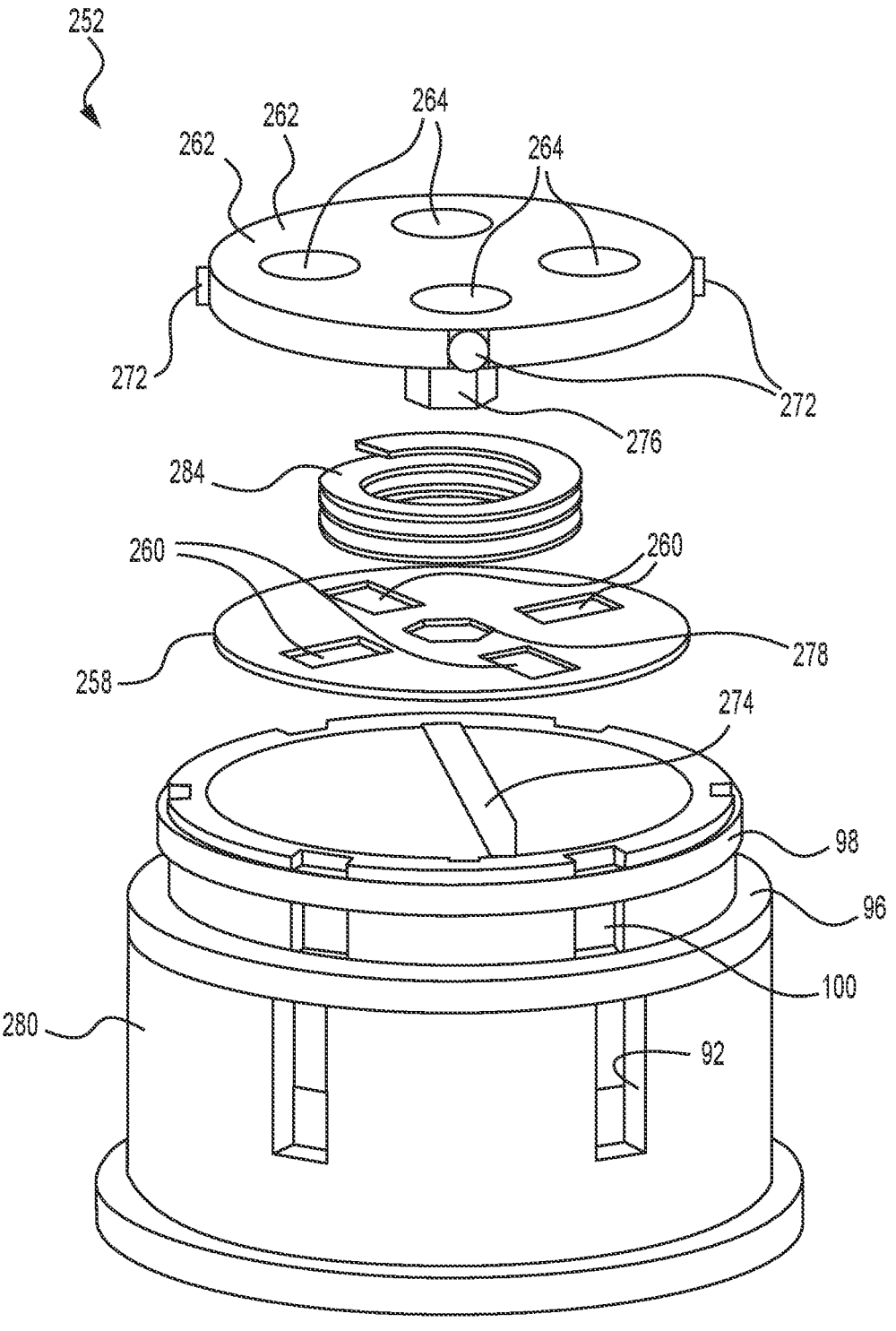
FIG. 17 shows an exploded view of the third HCS assembly.

FIG. 17 shows an exploded view of the third HCS assembly 252. As shown in FIG. 17, the translating member 262 includes four pins 272 extending radially outwardly. The third HCS base 280 defines four inclined grooves 274 each configured to receive a corresponding one of the pins 272 of the translating member 262 to rotate the translating member 262 and the rotary disc 258 in response to the translating member 262 moving axially within the third HCS base 280. The translating member 262 may include any number of the pins 272. For example, the translating member 262 may include three of the pins 272.

Still referring to FIG. 17, a keyed shaft 276 extends axially downwardly from the translating member 262 through a corresponding center hole 278 in the rotary disc 258 for driving the rotary disc 258 to rotate with the translating member 262 while allowing the translating member 262 to translate axially along the center axis A, while the rotary disc 258 remains in a fixed axial location. The keyed shaft 276 and the corresponding center hole 278 are shown with a hexagon shape, although other shapes may be used. The keyed shaft 276 may be integrally formed with the translating member 262, although they may be joined in another way, such as by welding, with an adhesive, a fastener, a threaded connection, etc. The keyed shaft 276 extends further beyond the rotary disc 258 and into a central hole in the third HCS base 280. The central hole in the third HCS base has a size and/or shape, such as a round shape, which does not engage the keyed shaft 276. The third HCS base 280 remains stationary and does not rotate with the rotary disc 258.

The third HCS assembly 252 also includes a return spring 284 disposed between the rotary disc 258 and the translating member 262. The return spring 284 is configured to bias the translating member 254 away from the rotary disc 258 and toward the piston 72.

Figures 18, 19:
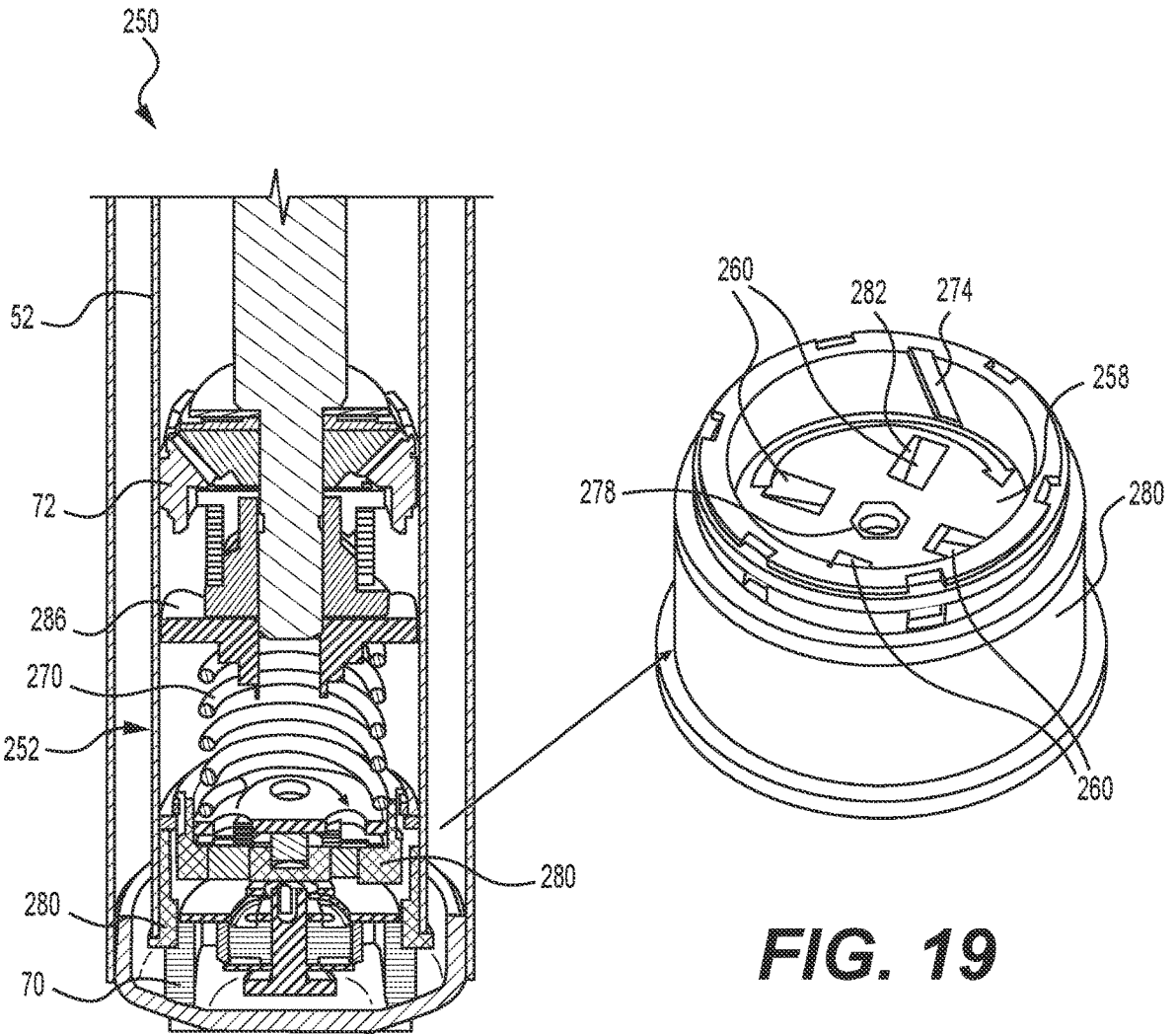
FIG. 18 shows a fragmentary cross-sectional view of the damper with the third HCS assembly of FIG. 16 during a compression stroke and in a partially-compressed position.
FIG. 19 shows an isolated perspective view of a portion of the third HCS assembly and in the configuration of FIG. 18.

FIGS. 18-19 show the third HCS assembly 252 during a compression stroke and in a partially-compressed position. FIG. 19 shows the third HCS assembly 252 without the translating member 262, which would otherwise obscure view of the rotary disc 258. As indicated by the rotation arrows, the rotary disc 258 rotates in a clockwise direction based on the influence of the translating member 262, with its pins 272 moving within the inclined grooves 274 of the third HCS base 280. Alternatively, the rotary disc 258 could rotate in a counter-clockwise direction. This rotation of the rotary disc 258 is caused by an axial force generated as a result of the piston 72 pushing the third spring guide 286 toward the third HCS base 280. The rotation of the rotary disc 258 causes the holes 260 of the rotary disc 258 to rotate away from the third HCS windows 282, causing the third HCS windows 282 to be, at least partially, obstructed by the rotary disc 258. A greater angle of rotation of the rotary disc 258 causes greater obstruction of windows 282, which generates greater oil restrictions and generates a corresponding increase in compression force. The amount of the third HCS windows 282 covered by the rotary disc 258 varies with the rotational position of the rotary disc 258 and with an axial position of the piston 72. In this way, the third HCS assembly 252 generates increasing damping force in the compression direction as the piston 72 moves towards the third HCS base 280. The profile of the inclined grooves 274 can be configured for desired operating parameters, such as velocity of closing the third HCS windows 282 and a position where the third HCS windows 282 are covered. When the piston 72 moves in the rebound direction, fluid flows through the fluid passages 92, 100, and past the sealing ring 96, in the same way as in the first HCS assembly 52, described herein.

FIG. 20 shows a third graph 300 showing force vs. displacement of the third damper 50 with the first HCS assembly 52, and with the piston 72 moving at a constant velocity. The third graph 300 includes a first plot 302 indicating standard forces produced in the third damper 50 with consistent compression and rebound forces over all or substantially all of its range of displacement. The third graph 300 also includes a second plot 304 indicating compression forces generated by the first HCS assembly 52 through a range of displacements, with continuous progressive increasing compression forces as the third damper 50 moves toward a fully-compressed displacement position.

FIG. 21 shows a fourth graph 310 showing force vs. displacement of the fourth damper 150 with the second HCS assembly 152, and with the piston 72 moving at a constant velocity. The fourth graph includes a third plot 312 indicating standard forces produced in the fourth damper 150 with consistent compression and rebound forces over all or substantially all of its range of displacement. The fourth graph 310 also includes a fourth plot 314 indicating compression forces generated by the second HCS assembly 152 through a range of displacements, with increasing compression forces as the fourth damper 150 moves toward a fully-compressed displacement position The compression forces increase in steps as the spring caps 111, 113 sequentially contact and cover the second HCS windows 182.

FIG. 22 shows a fifth graph 320 showing force vs. displacement of the fifth damper 250 with the third HCS assembly 252, and with the piston 72 moving at a constant velocity. The fifth graph 320 includes a fifth plot 322 indicating standard forces produced in the fifth damper 250 with consistent compression and rebound forces over all or substantially all of its range of displacement. The fifth graph 320 also includes a sixth plot 324 indicating compression forces generated by the third HCS assembly 252 through a range of displacements, with continuous progressive increasing compression forces as the fifth damper 250 moves toward a fully-compressed displacement position.

Figures 23, 24:
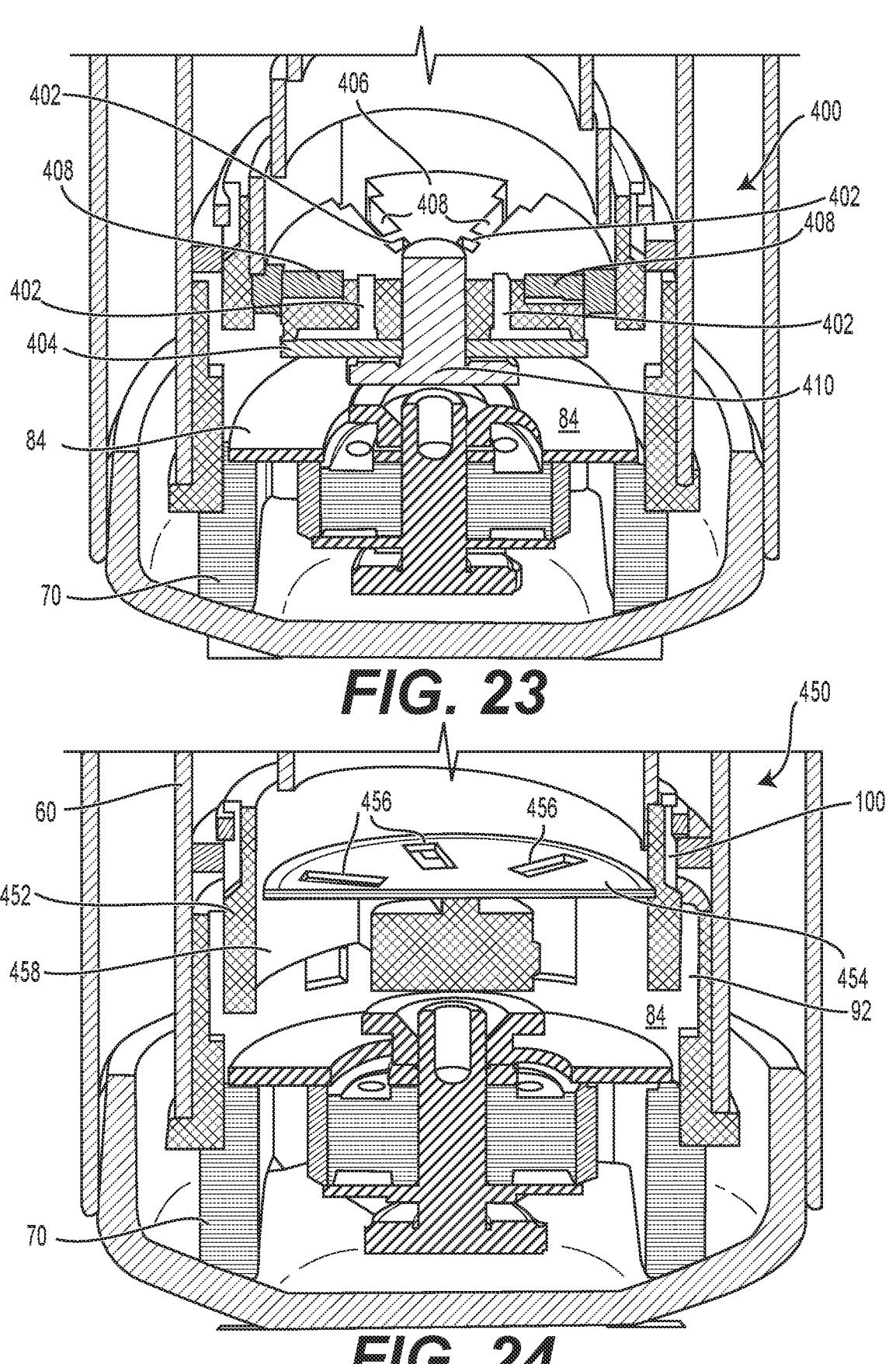
FIG. 23 shows a fragmentary cross-sectional view of a damper with an HCS assembly having a safety valve.
FIG. 24 shows a fragmentary cross-sectional view of a damper with a HCS assembly having a replaceable tuning disc.

FIG. 23 shows a fourth HCS assembly 400 with a safety valve 402, 404, 410. The safety valve 402, 404, 410 may function to protect suspension components against excessive HCS forces that may otherwise be generated. The safety valve 402, 404, 410 may be implemented within one or more of the other HCS assemblies 52, 152, 252 of the present disclosure. As described herein, the fourth HCS assembly 400 includes a modified adapter 406, with safety passages 402 extending therethrough. A plurality of valve discs 404 are disposed on a lower side of the modified adapter 406, covering a lower end of the safety passages 402. The valve discs 404 are configured to deflect downwardly, away from the modified adapter 406 to provide fluid communication between the compression chamber 64, above the fourth HCS assembly 400, and the exterior space 84 in response to a pressure differential therebetween exceeding a predetermined safety value. The safety valve 402, 404, 410 also includes a disc retainer 410 having an inverted T-shaped cross section and configured to hold an inner region of the valve discs 404 against the modified adapter 406. The disc retainer 410 leaves outer peripheral regions of the valve discs 404 unsupported, thereby enabling the outer peripheral regions of the valve discs 404 to deflect downwardly away from the modified adapter 406.

The fourth HCS assembly 400 is shown as a variation of the first HCS assembly 52, with the modified adapter 406 being similar to the first HCS base 80, including peripheral windows 408 that function similarly or identically to the first HCS windows 82 in the first HCS assembly 52. However, the safety valve 402, 404, 410 may be implemented in any of the HCS assemblies 52, 152, 252 of the present disclosure.

FIG. 24, shows a fifth HCS assembly 450 with an adapter 452 configured to attach to the inner tube 60 and a replaceable disc 454 defining a plurality of aperture windows 456 extending therethrough. The replaceable disc 454 may include any one of a plurality of different replaceable discs 454, with each of the different replaceable discs 454 having a different configuration of the aperture windows 456. The adapter 452 may be configured to retain and support the replaceable disc 454. The adapter 452 defines relatively large passages 458 extending therethrough for providing fluid communication between the aperture windows 456 and the base valve 70 via the exterior space 84. The relatively large passages 458 may be substantially larger in cross-section than the aperture windows 456, causing a negligible pressure drop. Thus, any pressure drop and resulting damping force are primarily produced by the aperture windows 456, which can characteristics, such as size, shape, number, position, etc. that are tuned to produce desired HCS force characteristics. The fifth HCS assembly 450 may allow a reduction to the cost of manufacturing because the manufacture of adapters with different sizes and window shapes requires expensive manufacturing tools, the need for these tools would be eliminated since only a single adapter would be required as opposed to a variety of them. The implementation of one universal adapter and the production of disks with various shapes and sizes of windows reduces the manufacturing costs of the described systems and methods. The characteristic of the safety valve is tuned by the number and thickness of the disks.

Together, the adapter 452 and the replaceable disc 454 may replace any of the HCS bases 80, 180, 280 in any of the HCS assemblies 52, 152, 252 of the present disclosure, with the aperture windows 456 defining a corresponding ones of the HCS windows 82, 182, 282.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility.

What is claimed is:

1. A damper assembly comprising:
a tube defining an interior chamber;
a piston slidably disposed in the tube and dividing the interior chamber into a rebound chamber and a compression chamber; and
a hydraulic compression stop (HCS) assembly disposed at least partially within the compression chamber and including an HCS base defining an HCS window providing fluid communication between the compression chamber and an exterior space, the HCS assembly further including a closure member configured to selectively and progressively cover a portion of the HCS window to restrict fluid flow therethrough, the portion of the HCS window covered varying in response to the piston moving toward the HCS base, wherein the HCS base includes an adapter configured to attach to the tube and a replaceable disc defining the HCS window, the replaceable disc including one of a plurality of different discs, each of the different discs having a different configuration of the HCS window.

2. The damper of claim 1, further comprising:

a conical belt spring disposed in the compression chamber and including a band of material formed as spiral-shaped coil with a base adjacent to the HCS base; and wherein the closure member includes the conical belt spring progressively covering the portion of each of the HCS windows in response to the piston compressing the conical belt spring as the piston moves toward the HCS base.

3. The damper of claim 2, further comprising:

the conical belt spring including a proximal end adjacent to the HCS base and a distal end opposite the proximal end; and a spring guide disposed in the compression chamber and attached to the distal end of the conical belt spring, the spring guide configured to engage the piston and to maintain the distal end of the conical belt spring aligned with a center axis of the damper.

4. The damper of claim 1, further comprising:

a spring guide disposed in the compression chamber;

a first spring attached to the spring guide and extending from the spring guide toward the HCS base; and a second spring attached to the spring guide and extending from the spring guide toward the HCS base, wherein during a compression stroke, during the spring guide being moved toward the HCS base, the first spring firstly starts to cover a first region of the HCS window, and as the spring guide continues to be moved toward the HCS base, the second spring then starts to cover a second region of the HCS window.

5. The damper of claim 4, further comprising a third spring extending between the HCS base and the spring guide and configured to bias each of the first spring and the second spring away from the HCS base.

6. The damper of claim 4, further comprising:

a first spring cap attached to the first spring opposite the spring guide, the first spring cap configured to selectively cover the first region of the HCS window;

a second spring cap attached to the second spring opposite the spring guide, the second spring cap configured to selectively cover the second region of the HCS window; and wherein the closure member includes the first spring cap and the second spring cap.

7. The damper of claim 1, further comprising: the HCS base defining a return fluid passage configured to transmit fluid from the exterior space and to the compression chamber in response to the piston moving away from the HCS assembly.

8. The damper of claim 7, further comprising a check valve configured to allow fluid flow through the return fluid passage from the exterior space and to the compression chamber while blocking fluid flow in an opposite direction.

9. The damper of claim 8, wherein the return fluid passage is disposed adjacent to the tube; and wherein the check valve includes a sealing ring extending annularly and adjacent to an interior wall of the tube and configured to selectively cover the return fluid passage to block fluid flow therethrough and in response to a pressure differential between the compression chamber and the exterior space.

10. The damper of claim 1, wherein the HCS window is one of a plurality of HCS windows in the HCS base; and wherein the closure member is configured to selectively and progressively cover a portion of each HCS window of the plurality of HCS windows.

11. The damper of claim 1, wherein the closure member includes a rotary disc defining a hole and configured to rotate relative to the HCS base, the rotary disc being rotatable between a first position with the hole overlying the HCS window and a second position with the hole rotationally spaced away from the HCS window and with the rotary disc blocking the HCS window.

12. The damper of claim 11, wherein the HCS assembly further comprises a translating member configured to rotate the rotary disc between the first position and the second position in response to a compression force applied thereto.

13. The damper of claim 12, wherein the translating member further comprises a pin extending radially outwardly; and wherein the HCS base defines an inclined grove configured to receive the pin of the translating member to rotate the translating member and the rotary disc in response to the translating member moving axially within the HCS base.

14. The damper of claim 12, wherein the HCS assembly further comprises a spring guide located within the compression chamber and a spring compression spring disposed between the spring guide and the translating member, the compression spring imparting the compression force to the translating member in response to the piston biasing the spring guide toward the HCS base.

15. The damper of claim 12, wherein the HCS assembly further comprises a return spring disposed between the rotary disc and the translating member, the return spring configured to bias the translating member toward the piston.

16. The damper of claim 1, further comprising a safety valve disposed within the HCS base and configured to provide fluid communication between the compression chamber and the exterior space, independent of the HCS window, in response to a pressure differential therebetween exceeding a predetermined safety value, thereby bypassing fluid restriction through the HCS window.

17. The damper of claim 1, further comprising:

a housing having a tubular shape disposed around the tube and coaxially therewith to define an exterior chamber extending annularly between the tube and the housing;

an end cap enclosing an end of the housing; and a base valve disposed in the main chamber of the housing adjacent to the end cap and configured to restrict fluid flow between the exterior space and the exterior chamber.

18. A hydraulic compression stop (HCS) assembly comprising:

an HCS base defining an HCS window providing fluid communication between a compression chamber of a damper and an exterior space;

a spring guide movable relative to the HCS base by action of a piston; and a closure member attached to the spring guide and configured to selectively and progressively cover a portion of the HCS window to restrict fluid flow therethrough, with the portion of the HCS window covered varying with a position of the spring guide relative to the HCS base, wherein the HCS base includes an adapter and a replaceable disc defining the HCS window, the replaceable disc including one of a plurality of different discs, each of the different discs having a different configuration of the HCS window.

19. The damper of claim 18, further comprising: a spring attached to the spring guide and configured to bias the spring guide away from the HCS base, wherein the closure member comprises the spring.

20. A damper assembly comprising:

a tube defining an interior chamber;

a piston slidably disposed in the tube and dividing the interior chamber into a rebound chamber and a compression chamber; and a hydraulic compression stop (HCS) assembly disposed at least partially within the compression chamber and including an HCS base defining an HCS window providing fluid communication between the compression chamber and an exterior space, the HCS assembly further including a closure member configured to selectively and progressively cover a portion of the HCS window to restrict fluid flow therethrough, the portion of the HCS window covered varying in response to the piston moving toward the HCS base, wherein the damper further comprises:

a conical belt spring disposed in the compression chamber and including a band of material formed as spiral-shaped coil with a base adjacent to the HCS base; and wherein the closure member includes the conical belt spring progressively covering the portion of each of the HCS windows in response to the piston compressing the conical belt spring as the piston moves toward the HCS base.

* * * * *